United States Patent [19]

Marcade et al.

[11] Patent Number: 4,646,528

[45] Date of Patent: Mar. 3, 1987

[54] TEMPERATURE SET POINT CONTROL FOR A REFRIGERATOR

[75] Inventors: Roque D. Marcade, Lincoln Township, Berrien County; Sandra S. Thurlow, Benton Township, Berrien County, both of Mich.; Donald W. Bookout, Ohio Township, Warrick County; Andrew T. Tershak, Center Township, Vanderburgh County, both of Ind.

[73] Assignee: Whirlpool Corporation, Benton Harbor, Mich.

[21] Appl. No.: 813,708

[22] Filed: Dec. 27, 1985

[51] Int. Cl.⁴ .................................... F25B 49/00
[52] U.S. Cl. .................................... 62/127; 236/94
[58] Field of Search .............. 62/126, 127; 364/506, 364/557; 236/94, 46 R

[56] References Cited

U.S. PATENT DOCUMENTS

| | | | |
|---|---|---|---|
| 3,001,378 | 9/1961 | Stutrud | 62/157 |
| 4,197,717 | 4/1980 | Schumacher | 62/213 |
| 4,235,368 | 11/1980 | Neel | 236/94 |
| 4,298,947 | 11/1981 | Tamura et al. | 364/551 |
| 4,314,666 | 2/1982 | Schotten | 62/126 X |
| 4,387,578 | 6/1983 | Paddock | 236/94 |
| 4,499,738 | 2/1985 | Motoyama et al. | 62/155 |

OTHER PUBLICATIONS

An article in HFD, a Fairchild publication dated Dec. 3, 1984, p. 55.
Product Literature Distributed by Sharp (original in the Japanese language together with a partial English translation).

*Primary Examiner*—William E. Wayner
*Attorney, Agent, or Firm*—Wood, Dalton, Phillips, Mason & Rowe

[57] ABSTRACT

A refrigerator control according to the present invention allows a user to establish one or more set points for controlling the temperature of one or more refrigerated compartments. Means are provided for selecting either a normal mode of operation whereby the set points may be manually established by a user or a priority mode of operation which overrides the normal mode whereby each set point is established at a preselected value so that the refrigerator is optimally operated in anticipation of expected operating conditions. Means are additionally provided for preventing erroneous entry of manually established set points.

31 Claims, 11 Drawing Figures

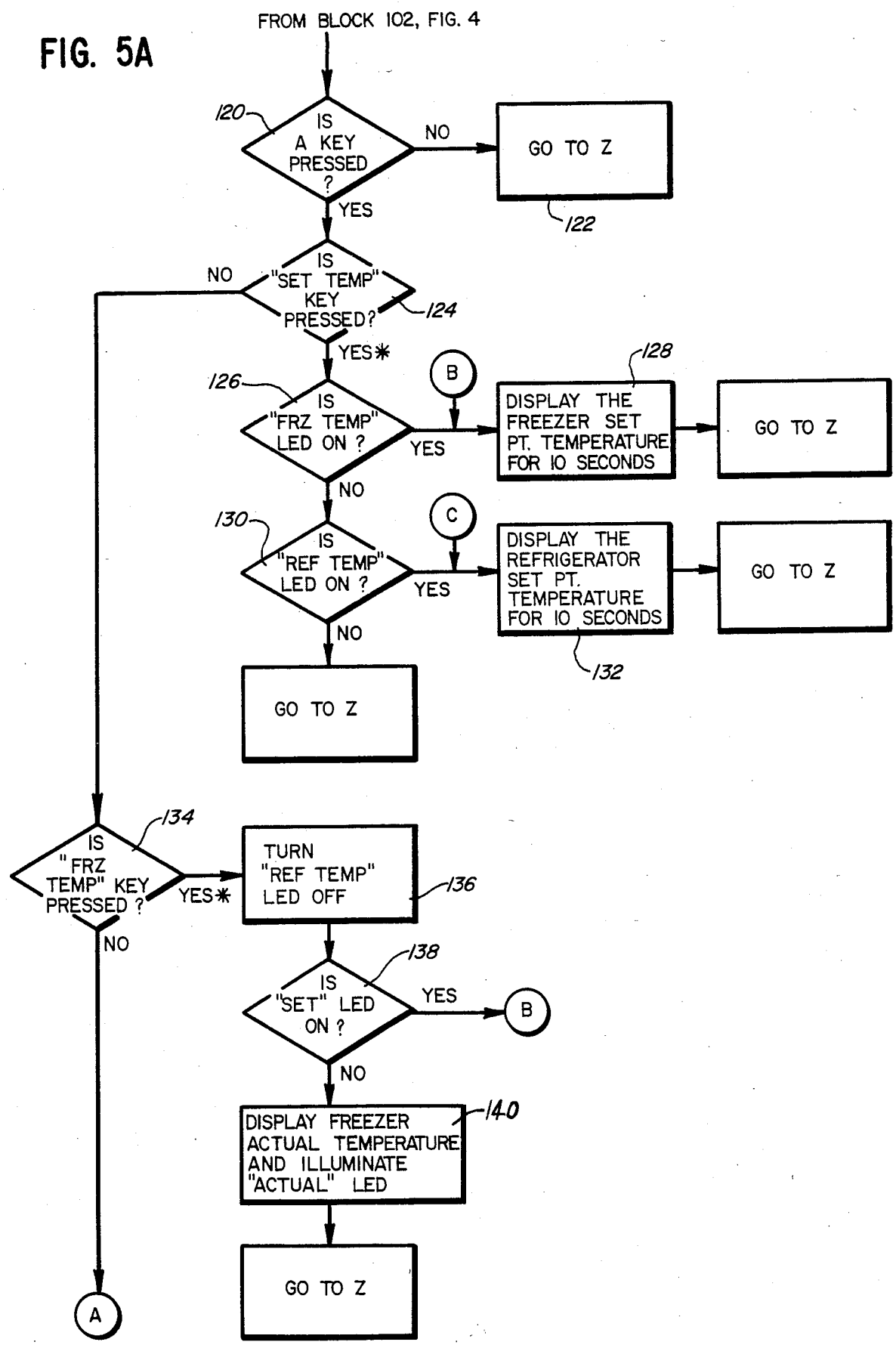

TEMPERATURE SET POINT CONTROL FOR A REFRIGERATOR

DESCRIPTION

TECHNICAL FIELD

The present invention relates generally to refrigerator controls, and more particularly to a control which allows a user to conveniently establish one or more temperature set points for a refrigerator so that the refrigerator is operated in a desired fashion.

BACKGROUND ART

Controls for refrigerators periodically operate cooling apparatus to cause the temperature of a refrigerated compartment to approach a set point temperature. Typically, in an electronic refrigerator control, the set point temperature is adjustable between upper and lower limits by means of a potentiometer.

Prior refrigerator controls have included means for temporarily resetting the set point temperature to take into account anticipated operational conditions. For example, Schumacher U.S. Pat. No. 4,197,717 discloses a refrigerator control having a user-operable "vacation switch" which, when operated to initiate a vacation mode, increases the temperature set point of the refrigerator so that the refrigerated compartment is maintained at a higher temperature to thereby conserve energy. It is asserted that this increase in compartment temperature does not adversely affect the quality of the food stored therein since the time-averaged compartment temperature following actuation of the vacation switch does not vary substantially from that occuring during normal operation at the lower temperature set point due to the presumed infrequent opening of the compartment door while the refrigerator is operating in the vacation mode. However, it is not clear that food quality is dependent upon the time-average of compartment temperature. Also, the increase in compartment temperature while operating in the vacation mode would seem to be at odds with the needs of most consumers who would justifiably desire food-preservation capabilities to be increased while operating in this mode because the vacation period would extend the amount of time that the food is stored in the refrigerator.

An article in HFD, a Fairchild publication dated Dec. 3, 1984, page 55, discloses a freezer from Magic Chef which has a user-adjustable long-term storage setting that maintains the temperature within the freezer at approximately $-10°$ F. to extend the food storage life.

Stutrud U.S. Pat. No. 3,001,378 and product literature distributed by Sharp (original in the Japanese language together with a partial English translation, copies filed herewith), disclose refrigerator controls having means for lowering the temperature temporarily in one or more compartments. Additionally, the Sharp product literature discloses a manually operable switch for selecting a "moderate operation" function whereby the temperature set point of a compartment is raised to conserve energy.

Tamura et al U.S. Pat. No. 4,298,947 discloses a digital temperature monitor for a refrigerator and Schotten U.S. Pat. No. 4,314,666 discloses a digital temperature set point establishing technique.

Motoyama et al U.S. Pat. No. 4,499,738 discloses a refrigerator control which executes different control routines whereby certain routines are considered preferential in the sense that such routines will continue to completion even if another routine is commanded during such time.

SUMMARY OF THE INVENTION

In accordance with the present invention, a refrigerator control permits user selection of set points for one or more refrigerated compartments so that the temperatures of such compartments are controlled in accordance with anticipated operating conditions and/or user preference.

More specifically, the control of the present invention includes at least one register which stores a set point temperature value, means for operating cooling apparatus in accordance with the stored set point temperature value whereby the temperature within a refrigerated compartment is caused to approach such set point temperature and means for establishing the temperature set point value stored in such register. The temperature set point establishing means includes means for selecting either a normal mode of operation or one of a plurality of priority modes of operation. The normal or manual mode of operation permits user-selection of one of a range of set point temperature values. The priority modes establish the temperature set point value at one of a plurality of preselected values so that the cooling apparatus is operated in optimal fashion under anticipated operating conditions.

The priority modes include a vacation mode which establishes the set point at a value which is consistent with long-term preservation of food and an auto temperature mode which establishes the set point temperature value at a predetermined value which provides for optimum and efficient operation of the refrigerator. The priority modes further include maximum cooling or refrigeration modes to allow a user to establish the fresh food compartment or freezer compartment set point temperature values at predetermined low values to permit quick chilling or freezing respectively of food items. The priority modes are in turn prioritized whereby certain modes remain in effect until completed even if a different priority mode is selected in the interim.

Furthermore, a set of user input keys is provided to permit user-selection of the mode or modes of operation for the refrigerator. The user-input keys associated with the manual mode of operation will only permit adjustment of the set point temperature value if the keystrokes are performed in a required sequence so that the chances of inadvertent adjustment of the value to an undesired value are minimized.

Furthermore, a display is provided to indicate to the user the compartment temperature, the set point temperature and the particular operating mode that has been selected. Means are also provided for preventing a user during a priority mode from manually changing the set point temperature value to which the control will return after the priority mode is no longer in effect so that the chances of entering an erroneous or undesired value are minimized.

BRIEF DESCRIPTION OF THE DRAWINGS

FIGS. 5A–5D, when joined along similarly lettered lines, together comprise a detailed flow chart of the programming stored in the ROM shown in FIG. 3 and represented by the block 104 of FIG. 4.

DESCRIPTION OF THE PREFERRED EMBODIMENT

Figure 1:
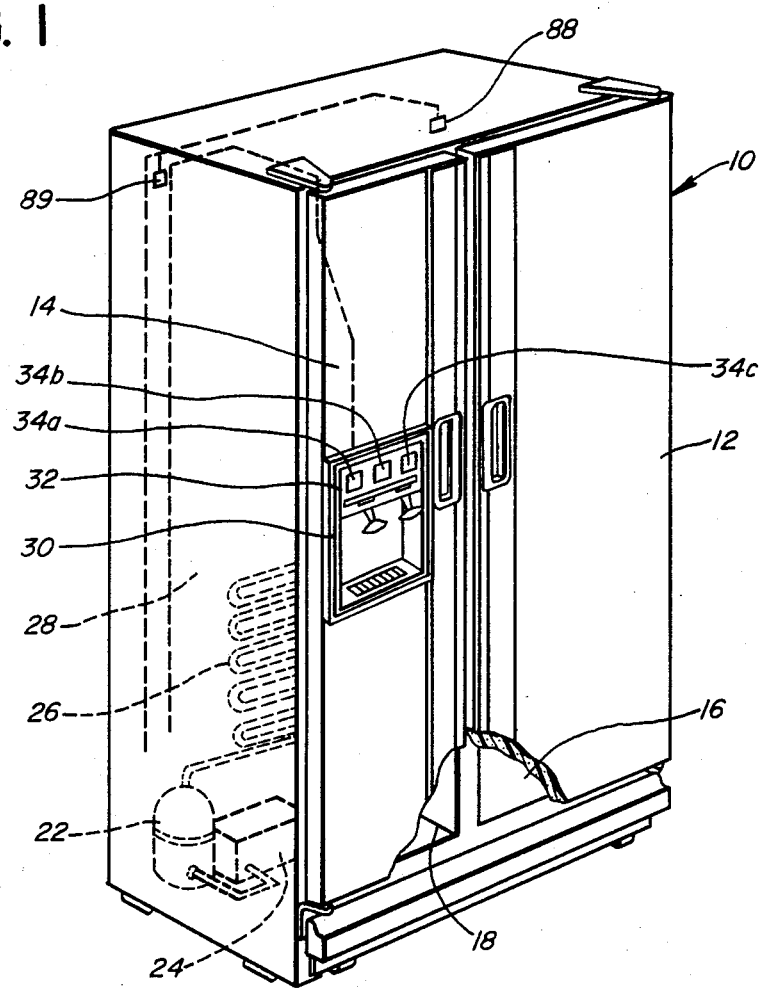
FIG. 1 is a perspective diagram, partially in phantom and with portions brokey away, illustrating a refrigerator with which the control of the instant invention may be used.

Referring now to FIG. 1, there is illustrated a refrigerator 10 that includes a fresh food or refrigerator compartment door 12 and a freezer compartment door 14, which enclose a fresh food or refrigerator compartment 16 and a freezer compartment 18, respectively. Air within the compartments 16,18 is cooled by cooling apparatus 20 comprising a compressor 22, a condenser 24 and an evaporator 26 which are interconnected by tubing to effect the flow of refrigerant therebetween.

Figure 3:
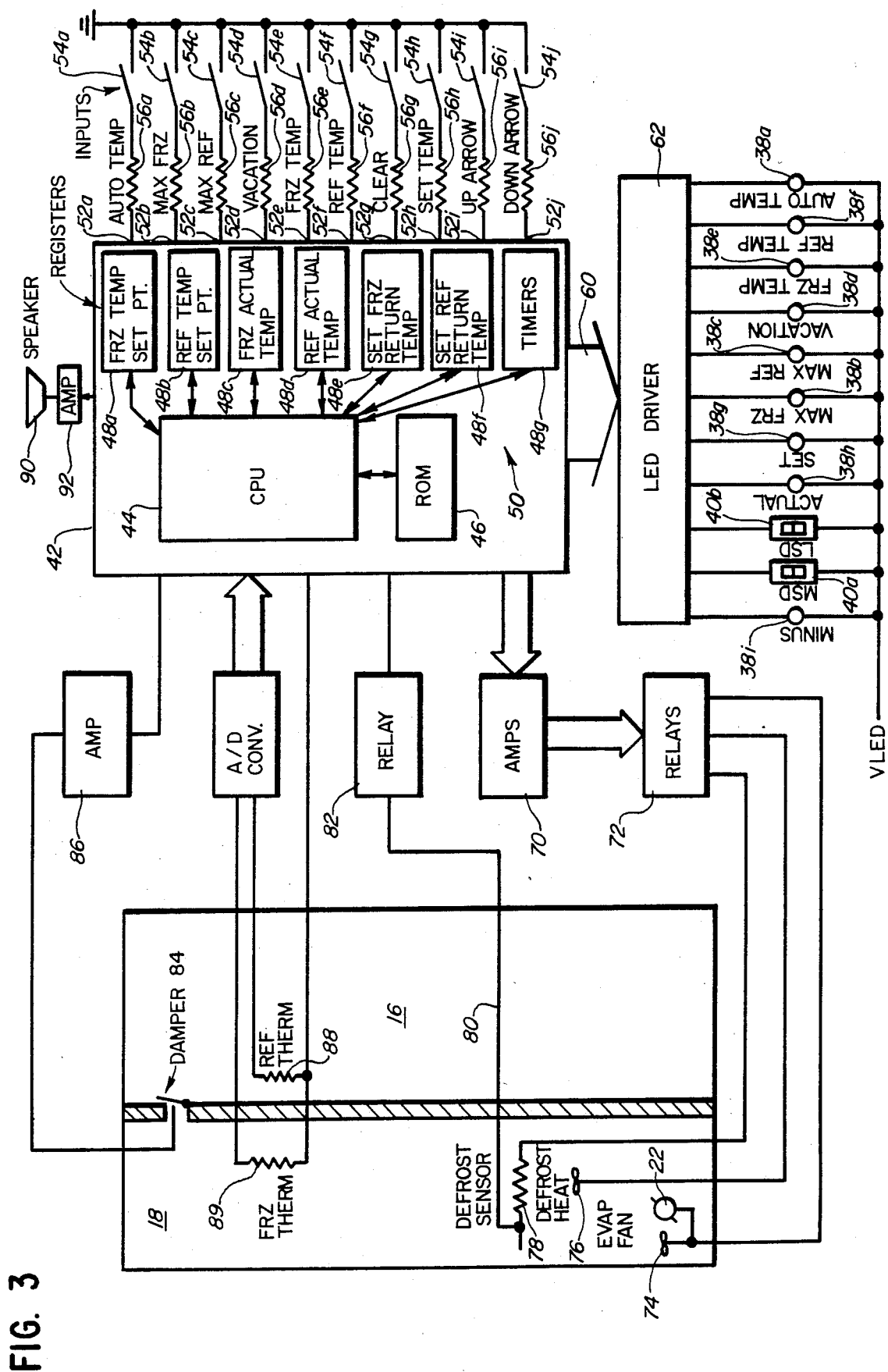
FIG. 3 is a combined block and schematic diagram of the control of the present invention.

The cooling apparatus also includes other conventional elements, such as a header or accumulator (not shown) and evaporator and condenser fans (shown in FIG. 3). The cooling apparatus is disposed in a rear compartment 28 of the freezer compartment.

Disposed within an opening in the freezer door 14 is a water/ice dispenser 30 for dispensing chilled water and ice. The dispenser 30 includes a portion 32 having three control panels 34a,34b,34c. The panels 34a and 34b are shown in greater detail in FIG. 2. Mounted within the panel 34c are various indicators that are not germane to the present invention and hence will not be described in detail.

Figure 2:
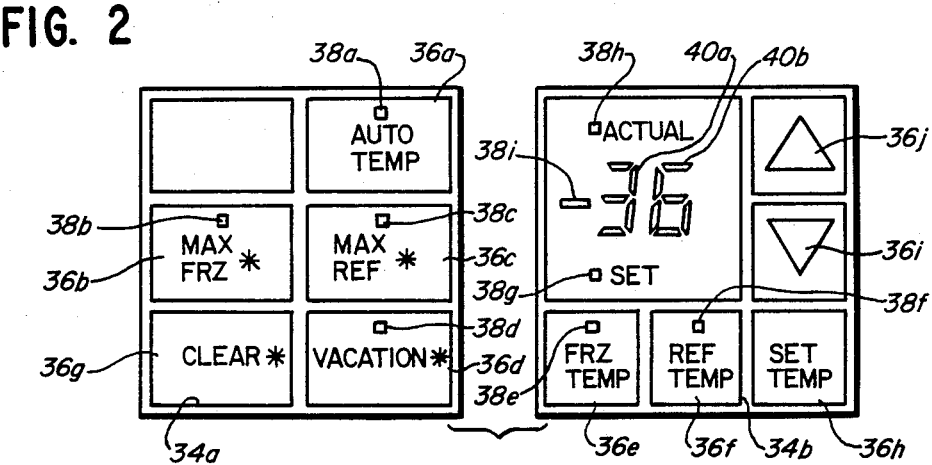
FIG. 2 is an elevational view of a portion of the control panel shown in FIG. 1.

Referring specifically to FIG. 2, mounted within each control panel 34a,34b is a plurality of buttons or keys 36a–36d,36g and 36e,36f,36h–36j, respectively, and indicators in the form of light emitting diodes or LED's 38a–38h. In addition, the control panel 34b includes a display comprising two seven-segment LED displays 40a,40b and a further LED 38i comprising a minus sign.

The buttons or keys 36, LED's 38 and displays 40 are coupled to a microcomputer which is shown in greater detail in FIG. 3.

The microcomputer 42 includes a central processing unit or CPU 44, a read only memory or ROM 46 and a series of registers 48a–48g which are a part of a rancom access memory or RAM 50.

In the preferred embodiment, the microcomputer 42 is a model 7538 microcomputer manufactured by NEC. It should be noted that the microcomputer 42 may be a different type or brand of processor, if desired.

The microcomputer 42 includes a series of inputs 52a–52j which receive signals generated by the buttons 36a–36j. More particularly, each of the buttons 36a–36j operates a switch 54a–54j, respectively. The switches 54a–54j are connected between ground potential and resistors 56a–56j coupled to the inputs 52. Closure of one of the switches 54 causes a low state signal to be developed at the corresponding input 52.

The microcomputer 42 includes a series of outputs, represented by the arrow 60, which are in turn coupled to an LED driver circuit 62. The circuit 62 includes outputs which are coupled to one end of each of the LED's 38 and the seven-segment LED displays 40. A second end of each of these LED's is coupled to a voltage $V_{LED}$.

Although single lines are shown connecting the LED driver circuit 62 to the seven-segment LED displays 40, it should be understood that each of these lines in fact represents seven conductors, one for each of the segments of the displays 40.

The microcomputer 42 is also coupled to circuit means for operating the cooling apparatus such means comprising a series of amplifiers 70 and relays 72 for operating the compressor 22, a condenser fan 74, an evaporator fan 76 and a defrost heater 78. A defrost sense line 80 is coupled by a relay 82 to the microcomputer 42.

Generally, the microcomputer 42 periodically energizes the defrost heater 78 to remove accumulated frost on the evaporator 26 and terminates such a defrost operation when a frost sensor (not shown) develops a high state signal on the sense line 80 indicating that the frost load has been removed from the evaporator.

The microcomputer 42 controls a movable damper 84 which is disposed between the compartments 16,18. The damper is used to accomplish individual temperature control over each of the compartments 16,18.

First and second thermistors 88,89 are disposed within the fresh food or refrigerator compartment 16 and the freezer compartment 18, respectively, and are exposed to the temperatures therein. These thermistors provide temperature information to the microcomputer 42. The thermistors may be replaced by other temperature sensors, if desired.

The microcomputer 42 is also coupled to a speaker 90 by an amplifier 92. The speaker is operated to provide audible feedback to a user, as explained more specifically below.

Figure 4:
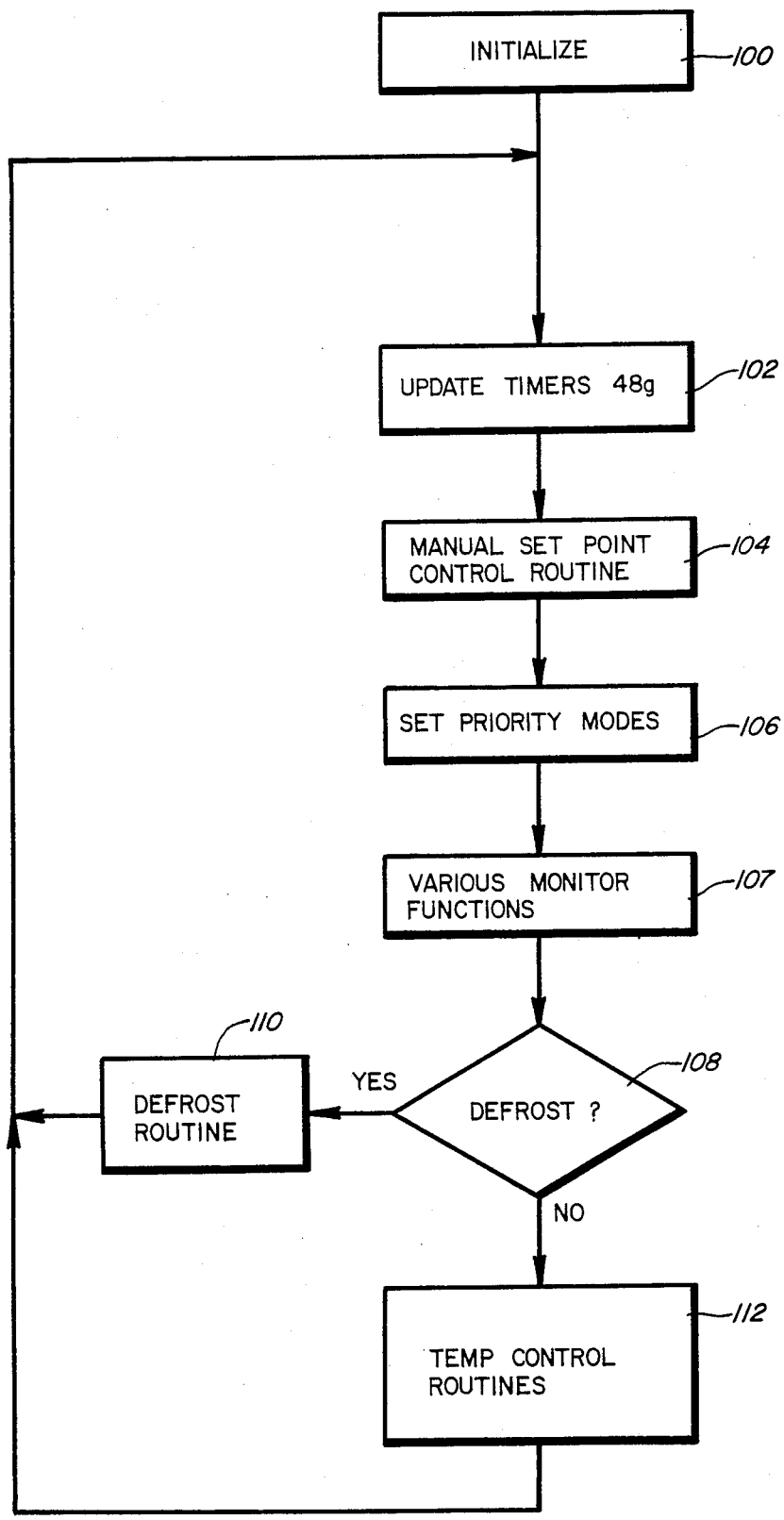
FIG. 4 is a generalized flow chart illustrating the operation of the control shown in FIG. 3.

Referring now to FIG. 4, there is illustrated a generalized flow chart of the programming stored within the ROM 46 of the microcomputer 42. It should be noted that the flow chart of FIG. 4 represents the overall programming for accomplishing a wide range of functions including the control of the present invention.

The control begins at a block 100 which is entered immediately following energization of the microcomputer 42. The block 100 initializes the various registers and timers 48. Control then passes to a block 102 which updates the values stored in the timer registers 48g. Generally, the timers 48g maintain the LED's 38 illuminated for predetermined time periods following actuation of the corresponding button 36 and provide the timing function for certain of the priority modes such as the maximum cooling or refrigeration modes. These functions are described in greater detail below.

Following the block 102 is a block 104 which implements a manual temperature set point operational mode. This control is described in greater detail below in connection with FIGS. 5A–5D.

Following the block 104 is a block 106 which permits a user to select one of a plurality of priority modes of operation. This control is specifically described with reference to FIGS. 6A–6C.

A block 107 then undertakes various monitoring functions, for example, detecting when an overtemperature condition is in existence within one of the refrigerated compartments 16,18, detecting when one of the doors 12,14 is open, detecting when servicing is needed and the like. These monitoring functions are completely optional and form no part of the present invention.

Following the block 107, a block 108 determines whether a defrost operation is needed. If so, control passes to a block 110 which energizes the defrost heater 78, FIG. 3, via the amplifiers 70 and relays 72 to begin or continue a defrost operation. Control then returns to the block 102.

If the block 108 determines that a defrost operation is not required at this time, control passes to a block 112 which, together with the above-described circuit means, control the cooling apparatus comprising the compressor 22, the condenser fan 74, the evaporator fan 76 and the damper 84 in accordance with the temperatures sensed by the fresh food or refrigerator thermistor 88 and the freezer thermistor 89.

It should be noted that the defrost routine implemented by the block 110 and the temperature control routines implemented by the block 112 form no part of the present invention and hence will not be further described.

Referring again to the blocks 104 and 106, these blocks together allow a user to control; (a) the value stored in the temperature set point registers 48a, 48b either in the manual or priority modes of operation; (b) the LED displays 40 and the LED 38i such that they indicate either the contents of the registers 48a, 48b or the actual temperature in one or both of the compartments 16,18 as sensed by the thermistors 88,89 and stored in registers 48c, 48d; (c) the energization of the LED's 38a-38h to indicate the operational mode currently in effect; and (d) the value stored in the return temperature registers 48e, 48f.

Initially, the displays 40 and indicators 38 are "dead" or de-energized until one or more of the keys 36 is actuated or depressed by a user. Once such actuation has taken place, one or more of the LED's 38 is energized for a period of time or continuously. In addition, the LED displays 40 may be energized, depending upon which button was actuated.

The buttons 36a–36d and 38g of the control panel 34a together comprise a plurality of keys for selecting one of the priority modes of operation. The priority modes include an auto temperature mode, a vacation mode and maximum cooling or refrigeration modes for each of the compartments 16,18. The maximum cooling mode for the fresh food or refrigerator compartment is invoked by actuation of the "max. ref." key 36c while the maximum cooling mode for the freezer compartment is invoked by actuation of the "max. frz." key 36b.

The vacation mode is immediately operative upon actuation of the "vacation" key 36d, provided neither of the maximum cooling modes is in effect at the time of actuation. Should the "vacation" key 36d be actuated while one of these modes is in effect, the vacation mode will not take effect until termination of the maximum cooling mode, as noted more specifically below.

The auto temperature mode is immediately operative upon actuation of the "auto temp." key 36a, only to put preestablished temperature values in both compartment return temperature registers 48f, 48g. However, similar to the operation of the vacation mode, the auto temperature mode is of lesser priority than the other priority modes and does not determine the actual set point temperature values if it is invoked while one of the maximum cooling modes or the vacation mode is in operation until such mode is terminated.

Generally, the auto temperature mode establishes set points for the fresh food and freezer compartments 16,18 consistent with optimal and efficient operation of the refrigerator under normal operating conditions. The vacation mode establishes set points for the compartments 16,18 consistent with optimum long-term preservation of food. In effect, this mode establishes each set point at a relatively low value in the range of permitted set point temperature values to enhance food preservation but not so low as to result in a wasteful consumption of power.

It can be seen, therefore, that these modes allow a user to anticipate the expected operating conditions of the refrigerator and to invoke operational modes which result in optimum operation of the refrigerator under these conditions.

When any of the buttons 36a–36d is actuated, the corresponding LED 38a–38d, respectively, is energized. The LED 38a associated with the "auto temp." key 36a remains energized for a brief period of time following actuation of such key. The LED's 38b–38d remain illuminated for the entire period of time the corresponding priority mode is in effect. Generally, the maximum cooling modes operate on a timed basis such that they terminate a predetermined period of time after they have been invoked. The vacation mode is an untimed mode of operation and remains in effect until the button 36g comprising a "clear" key is actuated.

The "clear" key 36g is used to disable all of the priority modes except "auto temp." and return operation to the manual mode of operation, when desired.

The series of keys 36e,36f and 36h–36j are used to select the manual mode of operation, view compartment temperatures or manually change set point temperature values during the manual mode. Generally, a user can determine the temperature of either of the compartments 16,18 read from registers 48c,48d respectively by actuating the "ref. temp." key 36f or the "frz. temp." key 36e alone without actuating any other keys. The set point temperature values stored in the registers 48a,48b can be ascertained by actuating either of the keys 36e,36f within a predetermined time period of actuation of the "set temp." (for set temperature) key 36h. In this case, the displays 40 and, if appropriate, the LED 38i are operated to indicate the set point temperature value in the selected one of the registers 48a,48b.

The contents of either of the return temperature registers 48e,48f can be varied or user-adjusted while in the manual mode by actuating either of the keys 36e,36f, the "set temp." key 36h and one of the keys 36i,36j (hereinafter the "up/down arrow" keys) within a predetermined length of time. For example, actuation of the "frz. temp." key 36e, the "set temp." key 36h and the "up arrow" key 36j all within a predetermined length of time results in an increase in the value stored in the return temperature register 48e. The changes to the temperature values stored in return temperature registers 48e,48f will simultaneously be transferred to set point registers 48a,48b respectively when the control is in the manual mode of operation.

When a compartment temperature is being indicated by the displays 40, the LED 38h is energized to indicate that the actual temperature is being displayed and not the set point temperature. On the other hand, when one of the keys 36e,36f and the key 36h have been actuated within the predetermined length of time, the LED 38g is illuminated to indicate to the user that a set point temperature is being indicated, and not a compartment temperature.

The LED's 38e–38h are illuminated for a short period of time following actuation of one of the buttons assumes that a priority mode is not in effect when the keys are actuated:

| KEY(S) ACTUATED | LED(S) ILLUMINATED | LED/DISPLAY ON DURATION (from time of release of last key in sequence) | MODE INVOKED | DURATION OF INVOKED MODE |
|---|---|---|---|---|
| "ref. temp." 36f alone | 38f | 10 seconds | * | * |
|  | 40 - indicate fresh food compartment temperature | 10 seconds |  |  |
|  | 38h | 10 seconds |  |  |
| "frz. temp." 36e alone | 38e | 10 seconds | * | * |
|  | 40 - indicate freezer compartment temperature | 10 seconds |  |  |
|  | 38h | 10 seconds |  |  |
| "ref. temp." 36f and "set temp." 36h within 10 seconds of one another | 38f | 10 seconds from time last button was released | * | * |
|  | 40 - indicate fresh food compartment set point temperature | 10 seconds from time last button was released |  |  |
|  | 38g | 10 seconds from time last button was released |  |  |
| "frz. temp." 36e and "set temp." 36h within 10 seconds of one another | 38e | 10 seconds from time last button was released | * | * |
|  | 40 - indicate freezer compartment set point temprature | 10 seconds from time last button was released |  |  |
|  | 38g | 10 seconds from time last button was released |  |  |
| "ref. temp." 36f, "set temp." 36h and one of "arrow" keys 36i,36j within a 10 second period | 38f | 10 seconds from time last button was released | manual | until priority mode is invoked |
|  | 40 - indicate changing fresh food compartment set point temperature | 10 seconds from time last button was released |  |  |
|  | 38g | 10 seconds from time last button was released |  |  |
| "frz. temp." 36e, "set temp." 36h and one of "arrow" keys 36i,36j within a 10 second period | 38e | 10 seconds from time last button was released | manual | until priority mode is invoked |
|  | 40, (also 38i if appropriate) - indicate changing freezer compartment set point temperature | 10 seconds from time last button was released |  |  |
|  | 38g | 10 seconds from time last button was released |  |  |
| "auto temp." 36 a | 38a | 10 seconds | auto temperature | until another priority mode is invoked or the manual mode is invoked |
| "vacation" 36d | 38d | until termination of vacation mode | vacation | until "clear" key 36g is actuated |
| "max. ref." 36c | 38c | until termination of maximum cooling mode | maximum cooling (refrigerator compartment) | until "clear" key 36g is actuated or 24 hours from release of button, which ever occurs first |
| "max. frz." 36b | 38b | until termination of maximum cooling mode | maximum cooling (freezer compartment) | until "clear" key 36g is actuated or 24 hours from release of button, whichever occurs first |

*No mode is invoked. Actual temperature value monitoring only.

36e, 36f, 36h–36j.

The manual mode of operation continues in effect until one of the priority modes is invoked, as noted more specifically below.

The table set forth below details the overall operation of the control of the present invention in response to specific sequences of key actuation. The following table it should be noted that the priority modes can be invoked concurrently and are prioritized, as noted more specifically below. In the event that two or more priority functions are concurrently invoked, only one of the functions will be in effect at any time, with the remaining functions becoming operative following termination of the first function.

The auto temperature priority function is mutually exclusive with respect to the manual mode of operation, i.e. only one can be in effect at any given time.

It should also be noted that the displays 40 and the LED 38i are capable of indicating actual or set point temperatures within displayable limits. In the preferred embodiment, the displays 40 and LED 38i are capable of displaying refrigerator compartment actual temperatures between limits of 33° F. and 42° F. and can display freezer compartment actual temperatures between −15° F. and +8° F. The freezer set point temperature can be adjusted and displayed anywhere within a range of −15° F. to +8° F. while the refrigerator temperature can be adjusted and displayed anywhere in the range between 33° F. and 42° F.

Any or all of the above durations and ranges can be varied, if desired, without departing from the spirit and scope of the invention.

Referring now to FIGS. 5A–5D, there is illustrated in greater detail the programming represented by the block 104 in FIG. 4.

Following the block 102, FIG. 4, a block 120 checks to determine whether any of the buttons or keys 36 is actuated or pressed. This is determined by checking whether a low state signal is present at any of the inputs 52. If not, control passes to a point Z, FIG. 5D, to bypass the entire manual operational mode routine shown as the block 104, FIG. 4. If, however, the block 120 determines that a key is actuated, then control passes to a block 124 which checks to determine whether the "set temp." key 36h has been actuated.

If the block 124 determines that the "set temp." key has been pressed, control passes to a block 126 which checks to determine whether the "frz. temp." LED 38e is energized. it should be noted that the asterisk next to the "yes" branch of the block 124 and the other asterisks in the flow chart indicate that the speaker 90 is operated to emit a single beep so that the user is advised that he has actuated the button(s) in the proper sequence.

As noted above, the "frz. temp." LED is energized upon actuation of the "frz. temp." key 36e and continues to be energized for 10 seconds following release of the key. The block 126 determines whether this LED is energized by checking the status of the output lines 60, FIG. 3.

If the LED 38e is energized, control passes to a block 128 which reads the contents of the freezer temperature set point register 48a and operates the LED displays 40 to display the freezer set point temperature for a 10 second period. If this is the first pass through the program, the register 48a has been loaded with a default value by the initialization block 100, FIG. 4, and hence this default value is displayed.

Following the block 128, control bypasses the remainder of the manual operational mode routine and proceeds to the block 106, FIG. 4.

If the block 126 determines that the "frz. temp." LED 38e is not energized, control passes to a block 130 which checks to determine whether the "ref. temp." LED 38f is energized. Similar to the operation of the "frz. temp." LED 38e, the LED 38f is energized for 10 seconds following actuation and release of the "ref. temp." key 36f. If the LED 38f is energized, a block 132 operates the LED displays 40 to cause same to indicate the contents of the refrigerator temperature set point register 48b for a 10 second period. As was noted in connection with the block 128, if this is the first pass through the program, a default value stored in the register 48b is indicated by the displays 40. The default values stored in the registers 48 remain the same until changed at a later point by a user.

Following the block 132 and the block 130 if it is determined that the LED 38f is not energized, control bypasses the remainder of the programming shown in FIGS. 5A–5D and proceeds to the block 106, FIG. 4.

If the block 124 determines that the "set temp." key 36h has not been actuated, a block 134 checks to determine whether the "frz. temp.38 key 36e has been actuated. If so, a block 136 de-energizes the "ref. temp." LED 38f. This block and another block later in the program cause the LED's 38e and 38f to operate in a "mutually exclusive" fashion in the sense that when one is on, the other if off, and vice versa. A block 138 then determines whether the "set" LED 38g is illuminated. As previously noted, the "set" LED 38g remains illuminated for 10 seconds following actuation and release of the "set temp.38 button 36h. If the "set" LED 38g is illuminated, then it has been determined that a user has actuated the "frz. temp." key 36e within a 10 second period following actuation and release of the "set temp." key 36h. The control interprets this sequence of button actuations as a command to display the freezer set point temperature value, and hence control returns to the block 128 which carries out this command.

If the "set" LED 38g has not been actuated, then it has been determined that a user has actuated the "frz. temp." button 36e alone, which action is interpreted by the control as a command to display the actual freezer temperature as detected by the microcomputer 42 and the freezer thermistor 89 and stored in register 48c. The block 140 operates the LED displays 40 to indicate the sensed freezer temperature and energizes the LED 38h to indicate to the user that the actual freezer temperature is being displayed.

Figure 5B:
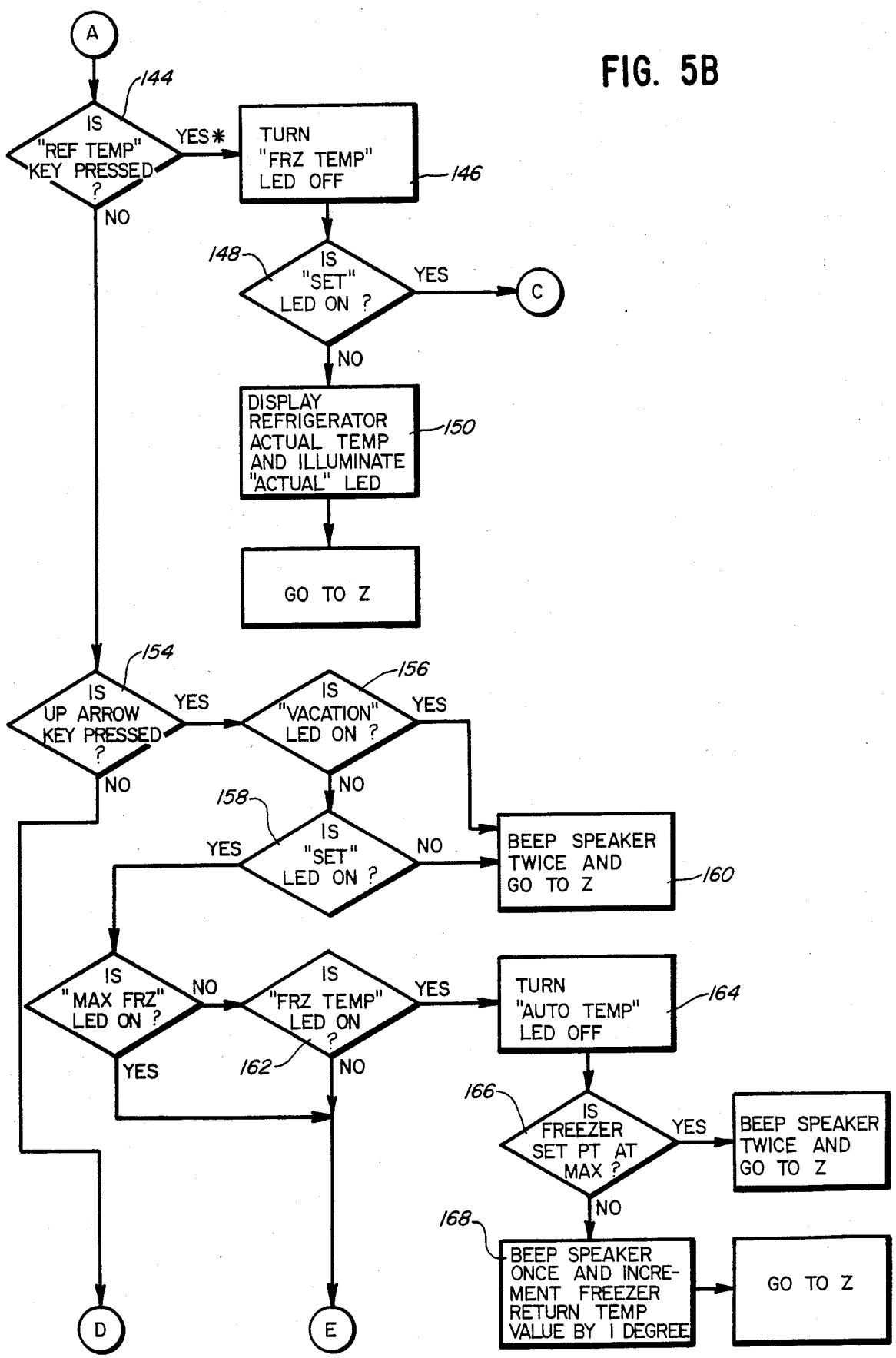
Figure 5C:
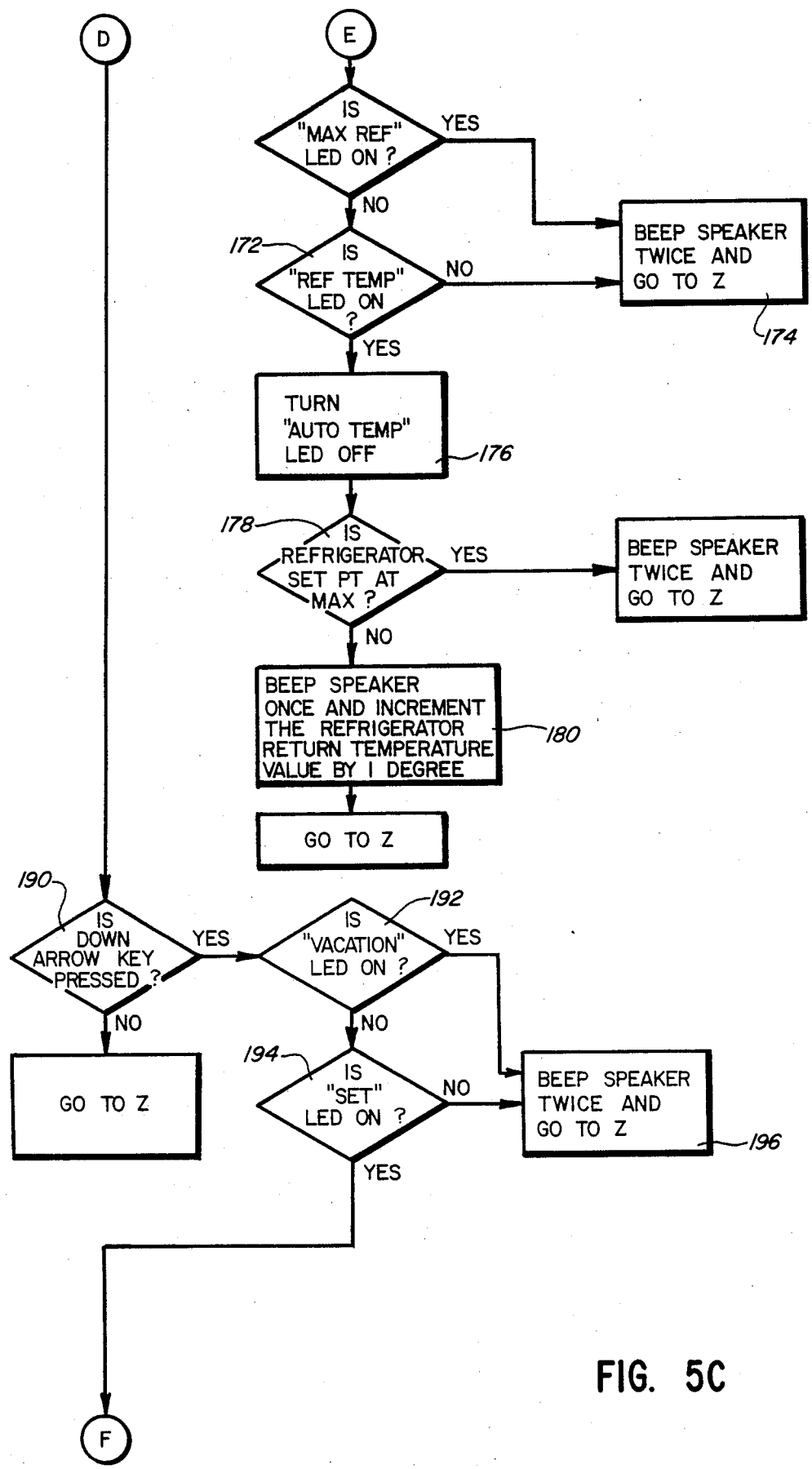
Figure 5D:
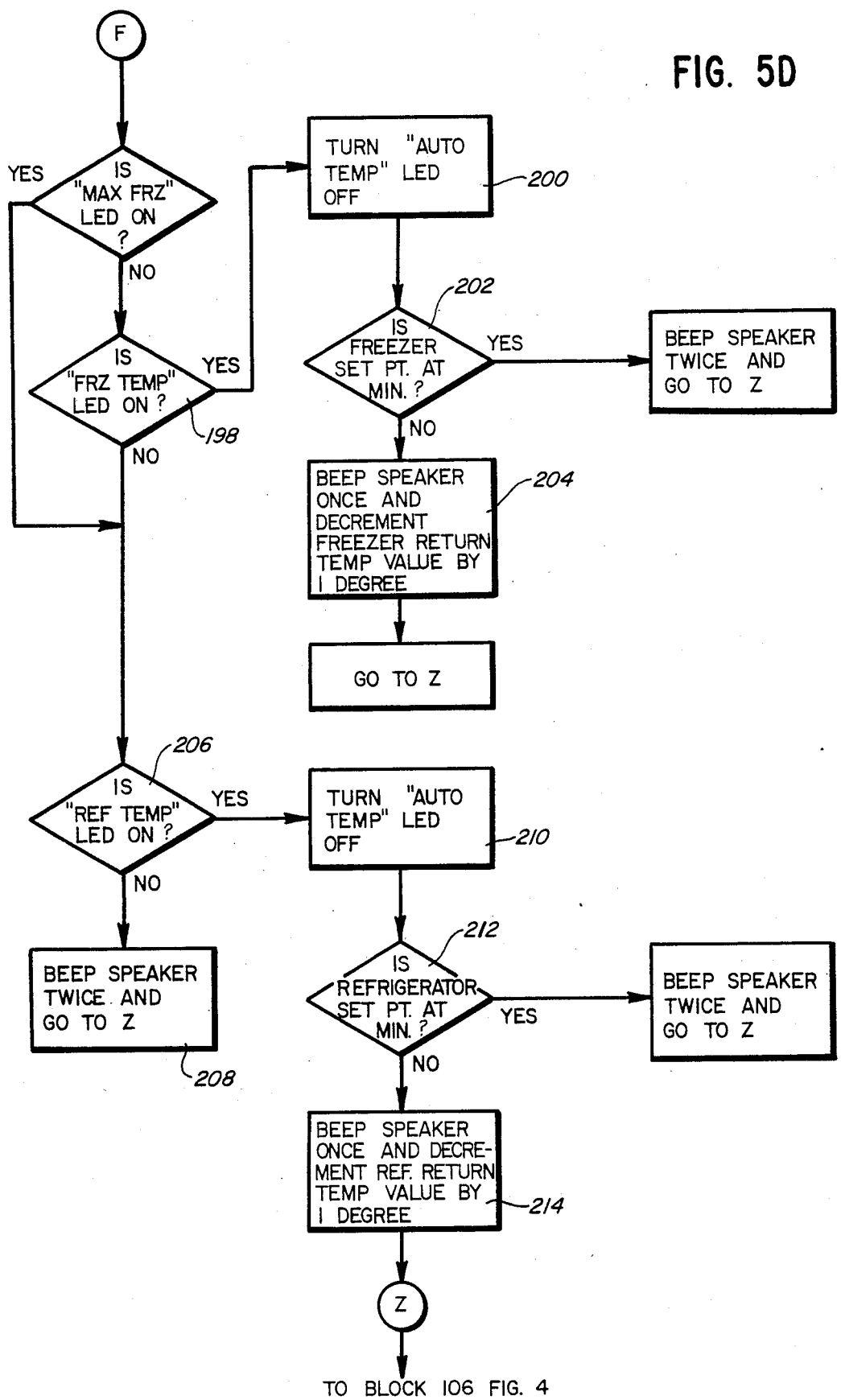

Following the block 140, control proceeds to the point Z to bypass the remainder of the programming illustrated in FIGS. 5B–5D.

If the block 134 determines that the "frz. temp." key 36e has not been actuated, a block 144, FIG. 5B, determines whether the "ref. temp." key 36f has been actuated. If so, the "frz. temp." LED 38e is de-energized by a block 146. This block and the block 130 provide the mutually exclusive function of the LED's 38e,38f noted above. A block 148 then checks to determine whether the "set" LED 38g is energized. If so, a user is requesting that the displays indicate the refrigerator or fresh food compartment set point temperature and hence control returns to the block 132 which accomplishes this result. On the other hand, if the block 148 determines that the "set" LED 38g is not illuminated, then a block 150 operates the displays 40 to indicate the temperature within the refrigerator compartment 16 as detected by the microcomputer 42 and the refrigerator thermistor 88 and stored in register 48d. Also, the "actual" LED 38h is energized to remind the user that the compartment temperature and not the set point temperature is being displayed.

Following the block 150, control passes to the point Z, FIG. 5D.

If it is determined by the block 144 that the "ref. temp." key 54f has not been depressed, then a block 154 checks the signal at the input 52i to determine whether the "up arrow" key 36j has been depressed. If so, a block 156 determines whether the "vacation" LED 38d is illuminated. If this is the case, then the "up arrow" has been pressed while the refrigerator is being operated in this priority mode of operation whereby the set point for both of the compartments has been established at a preselected value. When the "up arrow" key (or the "down arrow" key as noted below) is actuated under these conditions, this is considered to be an entry error and control passes to a block 160 which causes the speaker 90 to emit two audible beeps to indicate the entry error to the user. Control from block 160 passes to point Z, FIG. 5D. In fact, if this feature were not provided, a user might attempt to change a displayed set point which in fact is established by a priority mode. This could result in the establishment of set points in return temperature registers 48e,48f other than that desired by the user which would take effect upon termination of the priority mode. In order to prevent this undesirable circumstance, the control disables the manual adjustment of the set point temperature values in the return temperature registers while operating in a priority mode.

If the block 156 determines that LED 38d is not illuminated, a block 158 checks to determine whether the "set" LED 38g is illuminated. If not, then the "up arrow" key has been actuated without actuating the "set temp." key 36h. This is also considered to be an entry error and control passes to block 160 which causes the speaker 90 to emit two audible beeps to indicate the entry error to the user before passing to point Z, FIG. 5D.

On the other hand, if the block 158 determines that the "set" LED 38g is illuminated, then a block 159 checks to determine whether the "max. frz." LED 38b is energized. If so, then the "up arrow" has been pressed while the refrigerator is being operated with a priority mode of operation establishing the freezer compartment set point. Control will therefore pass to a block 169, FIG. 5C, bypassing the portion of the program that allows manual adjustment of the set points in the freezer return temperature register. This feature is to prevent the user from attempting to change a displayed set point which is established by a priority mode. This could result in the establishment of return temperature values, that the control would return to after the priority mode has expired, which would be erroneous. On the other hand, if the block 159 determines that the "max. frz." LED is not on, then a block 162 checks to determine whether the "frz. temp." LED 38e is energized. If so, then a user has issued a command to adjust the freezer set point and control passes from the block 162 to a block 164.

The block 164 de-energizes the "auto temp." LED 38a if it is energized so that the user is advised that he, and not the control, is establishing the set point of the freezer compartment 18.

A block 166 then checks to determine whether the freezer set point is at the maximum settable value. Generally, it is not desirable to allow a user to adjust the set point of either of the compartments 16,18 outside of a range of predetermined values. Hence, if the block 166 determines that the freezer set point is at the maximum value in the range, the microcomputer causes the speaker to issue two audible beeps and control passes to the point Z, FIG. 5D, so that no adjustment to the freezer set point is effected.

If the freezer set point is not at the maximum value within the predetermined range, a block 168 increments the value stored in the freezer return temperature value register 48e by 1° F. The microcomputer causes the speaker to beep once to signal the user that the command has been carried out. Control then passes to the point Z, FIG. 5D.

Referring again to the block 162, if the "frz. temp." LED 38e is not illuminated, then a block 169 checks to determine whether the "max. ref." LED 38c is energized. If it is, then the control passes to a block 174 which causes the speaker to issue two audible beeps to signal an erroneous entry and control passes to point Z, FIG. 5D. This is erroneous because the user would be attempting to either adjust one of the compartment set point values with both "max. frz." and "max. ref." modes in operation or adjust the refrigeration compartment set point value with the "max. ref." mode in operation. If block 169 determines that the "max. ref." priority mode is not in operation, then a block 172 determines whether the "ref. temp." LED 38f is illuminated. If not, then the "up arrow" and "set keys" 36j, 36h have been depressed without actuation of either of the "frz. temp." or "ref. temp." keys. This combination of key strokes is considered to be an erroneous key entry sequence and hence a block 174 causes the speaker to emit a pair of beeps to indicate to the user the incorrect actuation sequence. Control from the block 174 then passes to the point Z, FIG. 5D.

If the block 172 determines that the "ref. temp." LED 38f is energized, then the "auto temp." LED 38a is de-energized and a block 178 checks to determine whether the set point for the refrigerator compartment 16 is already at the upper limit of the range of settable or permitted values. If this is the case, then the user is attempting to set the refrigerator compartment set point above the maximum permitted value and hence the speaker emits a pair of beeps and control passes to the point Z so that no change in the refrigerator compartment set point is accomplished.

On the other hand, if the refrigerator set point is not at the maximum value, control passes to a block 180 which increments the contents of the refrigerator return temperature register 48f by 1° F. Following the block 180, control passes to the point Z, FIG. 5D.

Referring again to block 154 of FIG. 5B, if it is determined that the "up arrow" key is not pressed, control passes to a block 190, FIG. 5C, which checks to determine whether the "down arrow" key has been pressed. If not, control passes to the point Z since it has been determined that the user is not manually adjusting set point temperatures via the control panels 34.

If the "down arrow" key has been pressed, control passes to a series of blocks 192-214 which operate in a fashion similar to the previously-described blocks 156-180 to determine whether a user is requesting a downward change in the set point temperatures for either of the compartments 16-18. If this is determined to be the case, the control checks to determine whether the user is attempting to establish a set point below minimum permissible values. If this is not the case, then the set point of one of the compartments is decremented by 1°.

Figure 6A:
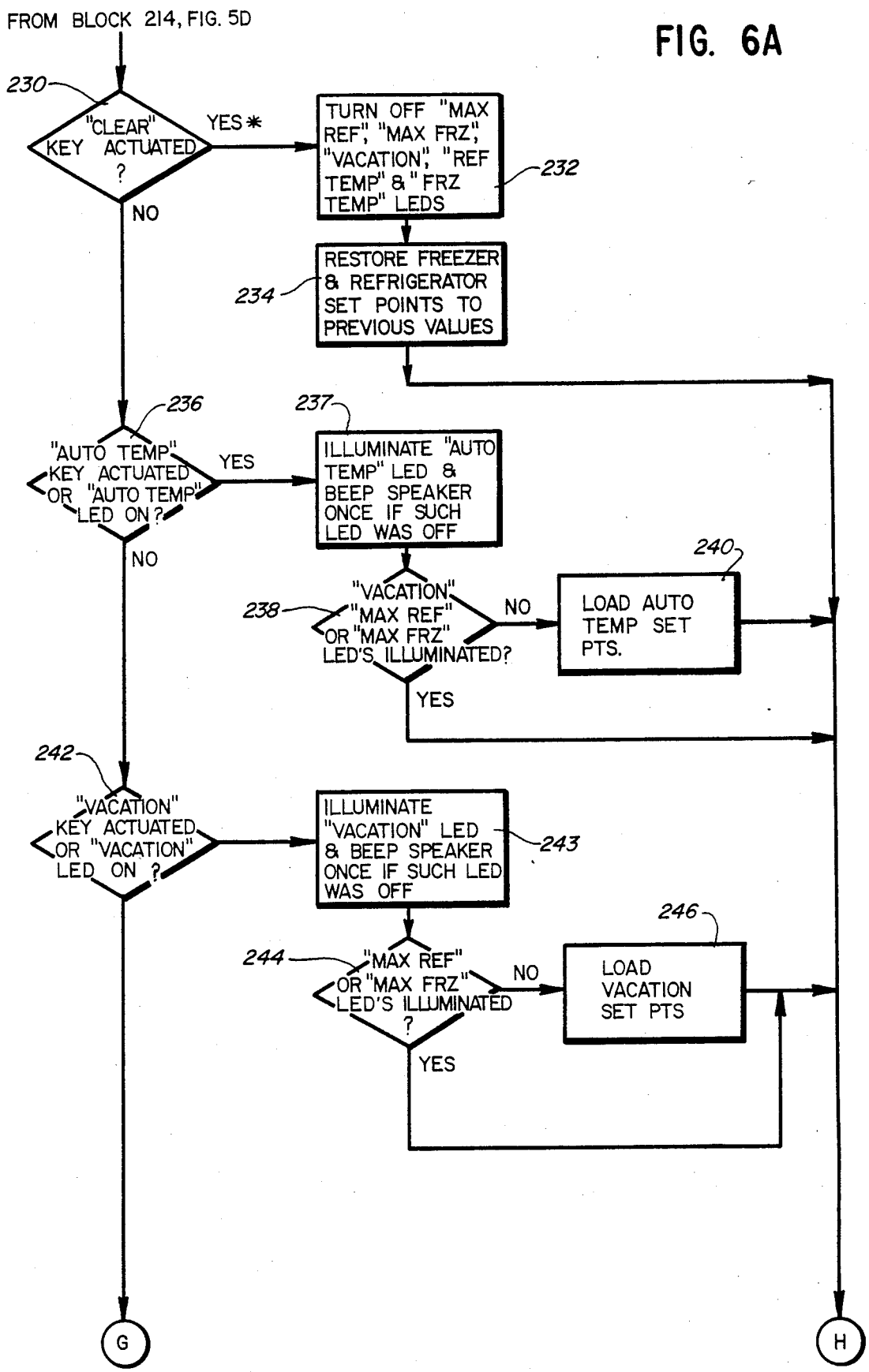
FIGS. 6A–6C, when joined along similarly lettered lines, together comprise a detailed flow chart illustrating the programming stored in the ROM shown in FIG. 3 and represented by the block 106 of FIG. 4.
Figure 6B:
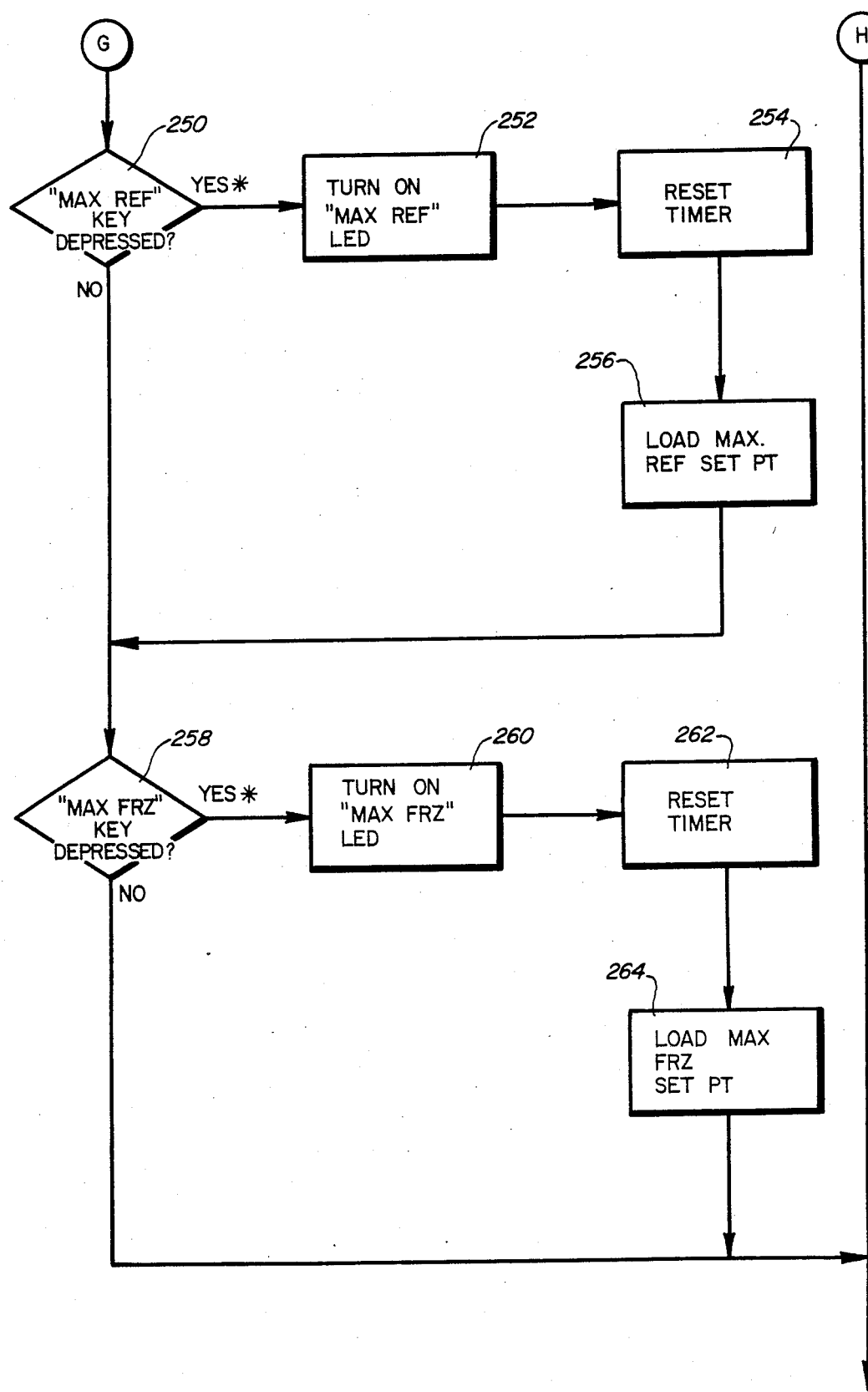
Figure 6C:
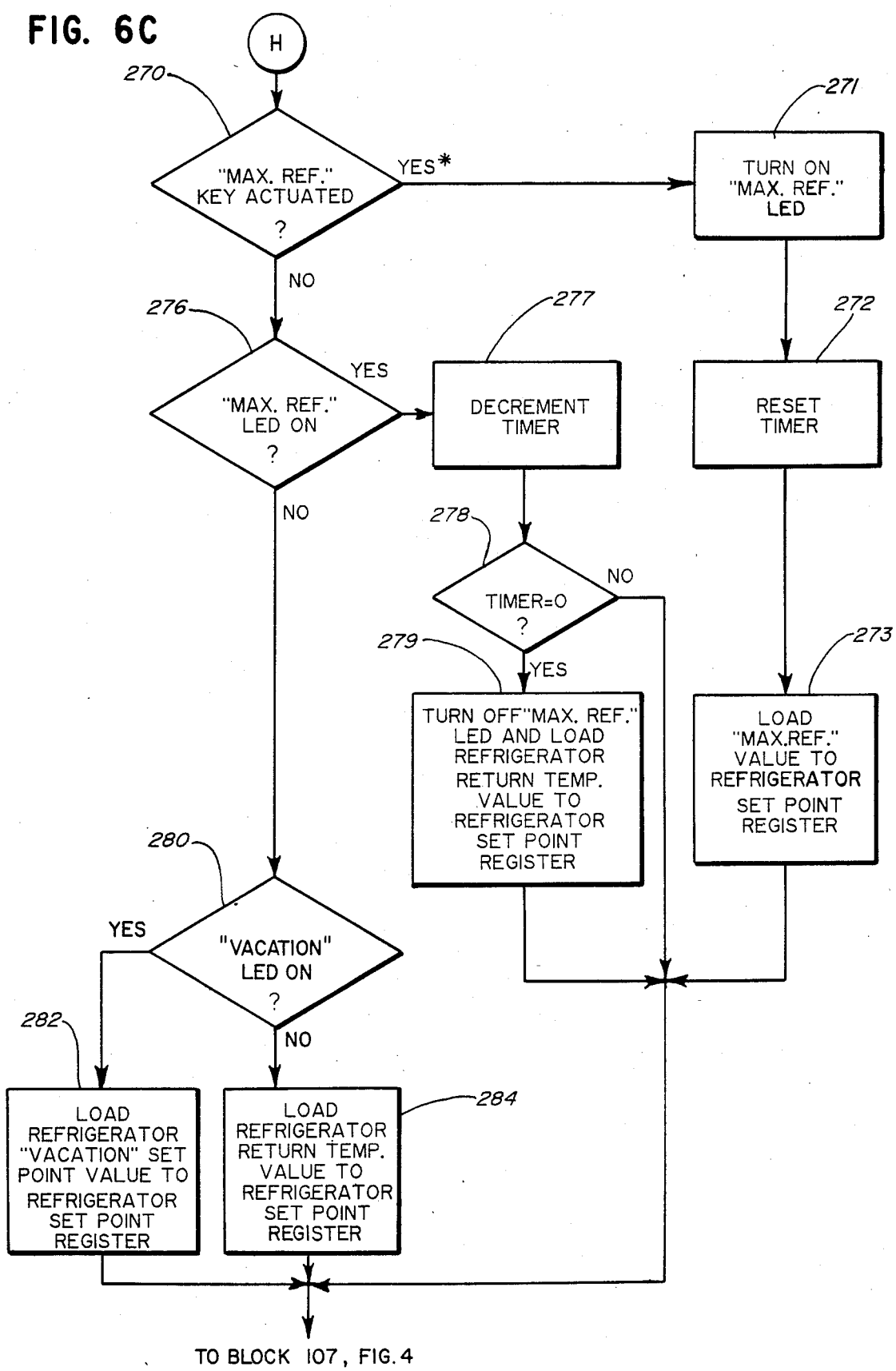

Referring now to FIGS. 6A-6C, there is illustrated in greater detail the programming for implementing the priority functions represented by the block 106 of FIG. 4 comprising the "auto temp." mode, the "vacation" mode, the "max. ref." mode and the "max. frz." mode. The priority modes at least temporarily override the set point settings manually established by a user and the blocks 120-214 of FIG. 5 by loading at least one of the registers 48a,48b with one of a set of preselected values which takes into account the anticipated operating conditions of the refrigerator. These functions, therefore, take precedence or priority over the manually established set points.

Moreover, the priority functions are themselves prioritized in the sense that they are assigned to three different priority levels with priority level one being the highest priority, priority level two being the next highest or intermediate priority and priority level three being the lowest priority. The functions having the highest or level one priority are the maximum cooling or refrigeration modes comprising the "max. ref." and "max. frz." functions while the "vacation" function is of the intermediate or level two priority and the "auto temp." function is of the lowest or level three priority level. In general, a function in effect having a particular priority level cannot be terminated by invoking a lower priority level during the time the higher priority level mode is in effect.

More particularly, and with specific reference to FIG. 6A, a block 230 checks to determine whether the "clear" key 36g has been depressed. If so, the speaker beeps once and control passes to a block 232 which de-energizes the LED's 38b–38d shown in FIG. 2. A block 234 then restores the freezer and refrigerator set point values to the user-selected values stored in registers 48e,48f, respectively, or, in the event a user has not established a set point value, to the default values. Control then passes to a block 236.

If the "clear" key 36g is not actuated, then block 236 checks to determine whether the "auto temp." key 36a is depressed. If so, a user is selecting this priority level three mode and hence, the speaker is beeped once to acknowledge that the command is received and the "auto temp." LED 38a is energized for 10 seconds, if not already on. Control then passes to a block 238 which loads the freezer and refrigerator return temperature registers 48e,48f with values stored in the ROM 46 for effecting the automatic temperature operation whereby the refrigerator is controlled for efficient operation under normal conditions. In the preferred embodiment, the values stored in the ROM represent a freezer temperature set point of 0° F. and a refrigerator temperature set point of 36° F. Control passes from block 238 to a block 240.

It should be noted that different values may be loaded into the registers 48e,48f for the "auto temp." mode, if desired.

It should further be noted that, although the control responds to the "auto temp." key unconditionally without regard to whether a higher priority mode is in operation, the "auto temp." mode is still a relatively low priority level three mode. This is due to the fact that actuation of the "auto temp." key only loads the preestablished values to the return temperature registers. As will be explained in more detail later, the compartment set point registers will receive the respective "auto temp." values only if no priority level one or two modes is in effect for the compartment.

If the block 236 determines that the "auto temp." key has not been depressed, a block 240 checks to determine whether the "vacation" key 36d is being actuated. If so, then the speaker is beeped once and control moves to a block 241 which illuminates the "vacation" LED 38d. Illumination of the "vacation" LED functions internally to the control as a flag which will cause the control to enter the "vacation" mode, if no higher priority mode is in operation, as will be explained in more detail later.

Following block 241, or if block 240 determines that the "vacation" key 36d is not being actuated, control moves to block 242, FIG. 6B.

Block 242 checks to determine whether the "max. frz." key 36b is actuated. If so, a block 243 illuminates the "max. frz." LED 38b and beeps the speaker once. Control then passes to block 244 which resets one of the timers 48g to 24 hours. A block 245 then stores a value corresponding to −10° F. in the freezer temperature set point register 48a so that items in the freezer compartment are more quickly cooled. Control then passes to block 270, FIG. 6C.

The foregoing illustrates the priority level one status of the "max. frz." mode. Once the "max. frz." key is actuated, the "max. frz." temperature value is unconditionally loaded to the freezer temperature set point register to immediately control the temperature level in that compartment. This mode will continue its priority operation until it times out or until it is cancelled by "clear" key 36g.

If the block 242 determines that the "max. frz." key 36b is not actuated then a block 248 checks to determine whether the "max. frz." LED is on. If so, then the control is in the "max. frz." mode of operation and a block 249 decrements the corresponding timer 48g by one unit of time. A block 250 follows block 249 and checks to determine if the timer has been decremented to zero during this pass through the flow diagram. If not, then control passes to block 270, FIG. 6C.

If the block 250 determines that the corresponding timer 48g has been decremented to zero then the "max. frz." mode has timed out and control passes to a block 252 which turns off the "max. frz." LED 38b and loads the temperature value stored in the freezer return temperature register 48e to the freezer temperature set point register 48a where this value will control the temperature level in the freezer compartment. Control then passes to block 270, FIG. 6C.

If block 242 determines that the "max. frz." button 36b is not being actuated and block 248 determines that the "max. frz." LED 38b is not illuminated then the "max. frz." mode is not in operation so control passes to a block 256 which checks whether the "vacation" LED 38d is illuminated. If block 256 determines that the "vacation" LED is illuminated then control passes to a block 258 which stores a value corresponding to 0° F. in the freezer temperature set point register 48a. This "vacation" temperature value causes operation of the freezer compartment consistent with the desired goal of long-term preservation of food. In the preferred embodiment, this set point is the same as the freezer compartment temperature value for the "auto temp." mode of operation, although they may be different if desired.

The above description illustrates the priority level two status of the "vacation" mode. If the control is in the "vacation" mode then the "vacation" temperature values for both the freezer and refrigerator compartments are loaded in the respective temperature set point registers without regard for set point values previously established in these registers by the manual mode or by a priority level three mode. If, however, a priority level one mode, such as "max. frz.", is in operation then the portion of the program controlling the "vacation" mode is bypassed so that the "vacation" mode cannot be placed in operation.

Returning to block 256, if it determines that the "vacation" LED 38d is not illuminated then control passes to a block 260 which loads the temperature value stored in the freezer return temperature register 48e to the freezer temperature set point register 48a. The value stored in the return temperature register may have been selected previously by operation of the "auto temp." mode or by manual adjustment of the return temperature value as illustrated in FIGS. 5A-5D. In either situation, when the "vacation" mode is cleared or after the "max. frz." mode is cleared or times out, the temperature value stored in the freezer return temperature register will now determine the temperature set point level of the compartment.

Following block 260, control passes to block 270, FIG. 6C, which, in conjunction with blocks 271-279, controls operation of "max. ref." mode which operates in the same manner as the "max. frz." mode to lower the fresh food compartment temperature set point to 33° F. for a predetermined period of time such as 24 hours. If the "max. ref." mode is not in operation, then blocks 280, 282 load a "vacation" refrigerator compartment set point value of 36° F. to the refrigerator temperature set point register 48b if the "vacation" LED 38d is illuminated. If the "vacation" mode is not in operation then the temperature value stored in the refrigerator return temperature register 48f is loaded to the refrigerator temperature set point temperature register 48b by block 284.

Following blocks 273, 279, 282 or 284, control passes to block 107 of FIG. 4 for execution of the remainder of the control sequence.

The blocks 244 and 272 allow a user to reinvoke a new 24 hour period during which one or both of the maximum cooling modes is in effect. During this time, the vacation and/or auto temperature modes, if invoked, are inhibited until the maximum cooling mode(s) terminate. Once this occurs, the vacation mode will be in effect and the auto temperature mode will be suppressed. Once the vacation mode is terminated, the auto temperature mode will become effective.

If the "vacation" key is pressed during a "max. frz." or "max. ref." mode the "vacation" LED will illuminate but the respective compartment set point will not be adjusted to the "vacation" value until the priority one mode expires.

It can be seen that the present invention allows a user to control the refrigerator in anticipation of expected operating conditions so that the refrigerator is controlled in an efficient and simple manner.

We claim:

1. A temperature set point control for a refrigerator having at least one compartment and cooling apparatus for causing the temperature within the compartment to approach a set point temperature comprising:
a register for storing a value corresponding to a set point temperature;
means coupled to the register for selecting one of a plurality of selectable values for storage in the register corresponding to a desired set point temperature to implement a manual mode of operation;
a series of indicators individually energizable to indicate the mode of operation;
a display which indicates the value stored in the register; and
means coupled to the indicators and display for causing same to selectively indicate the value stored in the register and the mode of operation;
wherein the selecting means includes a plurality of keys for enabling a user to establish the value stored in the register including a compartment temperature key and a set temperature key and wherein the causing means includes means for operating the display whereby it indicates the compartment temperature when the compartment temperature key is pressed alone and the value stored in the register when the compartment temperature key and the set temperature keys are actuated within a predetermined time of each other.

2. The temperature set point control of claim 1, wherein the keys further include up and down arrow keys and wherein the selecting means includes means for adjusting the stored value upwards when the set temperature key, the compartment temperature key and the up arrow key are actuated within the predetermined time of each other and means for adjusting the stored value downwards when the set temperature key, the compartment temperature key and the down arrow key are actuated within the predetermined time of each other.

3. The temperature set point control of claim 1, further including means coupled to the register for replacing the selected value with one of a plurality of predetermined priority values to implement a priority mode of operation whereby the refrigerator is controlled without regard to the selected value and wherein the keys include a vacation key, an auto temperature key and at least one maximum compartment refrigeration each of which, when actuated, operate the refrigerator in priority modes including a vacation mode, an auto temp. mode and a max. refrigeration mode, respectively.

4. The temperature set point control of claim 1, wherein the series of indicators include a plurality of LED's and wherein a portion of the LED's are associated with a portion of the keys and further including means for illuminating each LED for a preselected time period following actuation of the associated key.

5. A temperature set point control for a refrigerator having at least one compartment and cooling apparatus for causing the temperature within the compartment to approach a set point temperature comprising:
a register for storing a value corresponding to a set point temperature;
means coupled to the register for selecting one of a plurality of selectable values for storage in the register corresponding to a desired set point temperature to implement a manual mode of operation;
means coupled to the register for replacing the selected value with one of a plurality of predetermined priority values to implement a priority mode of operation whereby the refrigerator is controlled without regard to the selected value;
a series of indicators;
a display; and
means coupled to the indicators and display for causing same to selectively indicate the value stored in the register and the mode of operation;
wherein the selecting means includes a plurality of keys for enabling a user to establish the value stored in the register including a vacation key, an auto temperature key and at least one maximum compartment refrigeration key each of which, when actuated, operate the refrigerator in a vacation mode, an auto temp. mode and a max. refrigeration mode, respectively, and further including means for inhibiting operation of the refrigerator in the vacation or auto temp. modes while the max. refrigeration mode is in effect and means for inhibiting operation of the refrigeration in the auto temp. mode while the vacation mode is in effect.

6. A temperature set point control for a refrigerator having at least one compartment and cooling apparatus for causing the temperature within the compartment to approach a set point temperature comprising:
a register for storing a value corresponding to a set point temperature;
means coupled to the register for selecting one of a plurality of selectable values for storage in the register corresponding to a desired set point temperature to implement a manual mode of operation;
means coupled to the register for replacing the selected value with one of a plurality of predetermined priority values to implement a priority mode of operation whereby the refrigerator is controlled without regard to the selected value;
a series of indicators;
a display; and
means coupled to the indicators and display for causing same to selectively indicate the value stored in the register and the mode of operation;
wherein the selecting means includes a plurality of keys for enabling a user to establish the value stored in the register including a vacation key, an auto temperature key and at least one maximum compartment refrigeration key each of which, when actuated, operates the refrigerator in a vacation mode, an auto temp. mode and a max. refrigeration mode, respectively, and a clear key which, when actuated, places the operation of the refrigerator in the manual mode regardless of the mode in effect at the time of actuation of such key.

7. A temperature set point control for a refrigerator having refrigerator and freezer compartments and cooling apparatus for causing the temperature within the compartments to approach respective set point temperatures, comprising:
a register for storing a value corresponding to a set point temperature;
means coupled to the register for selecting one of a plurality of selectable values for storage in the register corresponding to a desired set point temperature to implement a manual mode of operation;
means coupled to the register for replacing the selected value with one of a plurality of predetermined priority values to implement a priority mode of operation whereby the refrigerator is controlled without regard to the selected value;
a series of indicators;
a display; and
means coupled to the indicators and display for causing same to selectively indicate the value stored in the register and the mode of operation;
wherein the selecting means includes a plurality of keys for enabling a user to establish the value stored in the register including a vacation key, an auto temperature key, a maximum refrigerator compartment refrigeration key and a maximum freezer compartment refrigeration key each of which, when actuated, operates the refrigerator in a vacation mode, an auto temp. mode, a max. refrigerator refrigeration mode and a max. freezer refrigeration mode, respectively, wherein the last two modes establish a set point for the respective compartment at a preselected low value for a certain period of time.

8. A temperature set point control for a refrigerator having at least one compartment and cooling apparatus for causing the temperature within the compartment to approach a set point temperature comprising:
a register for storing a value corresponding to a set point temperature;
means coupled to the register for permitting user-selection of one of a range of values for storage in the register whereby the refrigerator is operated in a manual mode of operation;
means coupled to the register for replacing the value stored in the register with one of the plurality of predetermined priority values to implement one of a plurality of priority modes of operation whereby the refrigerator is controlled without regard to the user-selected value, the priority modes of operation being prioritized into at least a first priority level and a second, lesser priority level; and
means for preventing operation of the refrigerator in a priority mode of the second priority level if the refrigerator is already operating in a priority mode of the first priority level.

9. The temperature set point control of claim 8, wherein the preventing means includes means for delaying operation of the refrigerator in the priority mode of the second priority level until the priority mode of the first priority level is terminated.

10. The temperature set point control of claim 9, wherein the priority modes include a maximum compartment refrigeration mode and a vacation mode whereby the maximum compartment refrigeration mode is of the first priority level and the vacation mode is of the second priority level, the predetermined priority values for such modes being established at values consistent with the long-term preservation of food.

11. The temperature set point control of claim 10, wherein the priority modes further include an auto temperature mode prioritized in a third priority level lesser than the first and second priority levels and further including second means for preventing operation of the refrigerator in the auto temperature mode if the refrigerator is already operating in either the maximum compartment refrigeration mode or the vacation mode.

12. The temperature set point control of claim 11, wherein the second preventing means includes means for delaying operation of the refrigerator in the auto temperature mode until the priority modes of the first and second priority levels are terminated.

13. The temperature set point control of claim 11, further including means for selectively cancelling all of the priority modes of operation to permit control in the manual mode of operation.

14. The temperature set point control of claim 11, wherein the refrigerator includes a refrigerator compartment and a freezer compartment and first and second set point registers for storing set point values for the refrigerator and freezer compartments, respectively, and wherein the maximum compartment refrigeration mode comprises a maximum refrigerator compartment refrigeration mode (max. ref.) and a maximum freezer compartment refrigeration mode (max. frz.).

15. The temperature set point control of claim 14, where values corresponding to the following set points are stored in the first and second registers for each of the following priority modes:

| Priority Mode | Refrigerator Set Point | Freezer Set Point |
| --- | --- | --- |
| auto temperature | 36° F. | 0° F. |
| vacation | 36° F. | 0° F. |
| max. ref. | 33° F. | — |
| max. frz. | — | −10° F. |

16. A control for a refrigeration device having a below-freezing compartment and a fresh food compartment and cooling means for independently lowering the temperature in each compartment comprising:
   a freezer temperature set point register associated with the below-freezing compartment for storing a first temperature value;
   a refrigerator temperature set point register associated with the fresh food compartment for storing a second temperature value;
   means for selectively energizing said cooling means to cause the temperature in each of said below-freezing compartment and said fresh food compartment to approach a level corresponding to the value stored in the temperature set point register associated with the respective compartment; and
   temperature set point establishing means for establishing the temperature values stored in said freezer temperature set point register and said refrigerator temperature set point register comprising,
      a first user-adjustable set point determining means associated with the freezer temperature set point register for selecting a temperature value from a first predetermined range of values,
      a second user-adjustable set point determining means associated with the refrigerator temperature set point register for selecting a temperature value from a second predetermined range of values,
      a memory having stored therein a fixed freezer temperature value preselected from a lower portion of said first predetermined range of values and a fixed refrigerator temperature value preselected from a lower portion of said second predetermined range of values, and
      selection means coupled to the first and second user-adjustable set point determining means, the memory and the registers for selecting a first normal mode of operation or a second vacation mode of operation to cause in said normal mode the contents of the first and second user-adjustable set point determining means to be transferred to the respective freezer and refrigerator set point registers and to cause in said vacation mode the fixed freezer and refrigerator temperature values stored in the memory to be transferred to the respective freezer and refrigerator set point registers;
   whereby the selection of the normal mode provides user-adjustment of the compartment temperature set points and selection of the vacation mode establishes fixed compartment temperature set points consistent with optimum long-term preservation of food items.

17. The control of claim 16, wherein said fixed freezer temperature value is 0° F. and said fixed refrigerator temperature value is 36° F.

18. The control of claim 16, wherein the selection means comprises a user-actuable vacation key and a clear key whereby actuation of the vacation key initiates operation in the vacation mode, such operation continuing until the clear key is actuated at which point the normal mode resumes.

19. In a refrigerator having a compartment, cooling means for lowering the temperature in the compartment, temperature sensing means disposed in said compartment for monitoring the compartment temperature, and circuit means responsive to the temperature sensing means for selectively energizing the cooling means to cause the compartment temperature to approach a set point temperature, a control for selectively establishing the set point temperature, comprising:
   a temperature set point register capable of storing a number representing a set point temperature level;
   temperature number readout means coupled to said temperature sensing means and said temperature set point register;
   a compartment temperature display switch connected to said temperature number readout means and actuable to cause said readout means to display said compartment temperature;
   a temperature set point display switch connected to said temperature number readout means and actuable to cause said readout means to display said set point temperature;
   temperature set point establishing means actuable by the user when enabled for selectively establishing the number in said set point register, and
   enabling means responsive to said compartment temperature switch, said temperature set point display switch and said set point establishing means for enabling said temperature set point establishing means to adjust the number in said set point register only when said compartment temperature display switch, said temperature set point display switch and said set point establishing means are all actuated within a predetermined time period.

20. The control of claim 19, further including first and second indicators for indicating when the compartment temperature is being displayed and when the set point temperature is being displayed, respectively.

21. The control of claim 19, further including means for operating the refrigerator in a priority mode of operation whereby the number in the set point register is established at a fixed preselected value and means for preventing enabling of the temperature set point establishing means when the refrigerator is operated in the priority mode.

22. In a refrigerator having a compartment and cooling means for lowering the temperature in the compartment, a control for selectively energizing said cooling means comprising:
   temperature sensing means for monitoring the temperature in the compartment;
   a temperature set point register capable of storing a number representing a temperature level;
   circuit means responsive to the temperature sensing means and the temperature set point register for selectively energizing the cooling means to cause the compartment temperature to approach the temperature level corresponding to the number in the set point register;
   monitoring means for displaying the number stored in said temperature set point register; and
   means for establishing the number stored in said set point register comprising priority mode means selectively actuable by a user for storing a first preselected temperature number value in the set point register, manual mode means for establishing a second temperature number value in the set point register provided said priority mode means has not been actuated and adjusting means actuable by a user for selectively adjusting said second temperature number value, said adjusting means being inoperative when said priority mode means has been actuated.

23. The control of claim 22, wherein the refrigerator includes fresh food and freezer compartments and first and second set point registers for the fresh food and freezer compartments, respectively, and wherein the priority setting means includes preselected temperature number values in at least one of the first and second set point registers.

24. The control of claim 22, wherein the priority mode means includes means for selecting one of a plurality of operational modes whereby a selected one of a plurality of preselected temperature number values is stored in the set point register.

25. The control of claim 24, wherein the selecting means includes means for initiating a vacation mode of operation wherein a preselected temperature number consistent with optimum long-term preservation of food is stored in the set point register.

26. The control of claim 22, wherein the adjusting means includes a set temperature key and up and down temperature keys whereby the set temperature key and one of the up or down temperature keys must be actuated within a predetermined time period to enable adjustment of the second temperature number value.

27. The control of claim 26, wherein the refrigerator includes fresh food and freezer compartments and first and second set point registers for the fresh food and freezer compartments, respectively, and wherein the adjusting means further includes a refrigerator temperature key and a freezer temperature key whereby one of the refrigerator keys or the freezer temperature key and the set temperature key and one of the up or down temperature keys must be actuated within the predetermined time period in order to adjust the second temperature number value.

28. A temperature set point control for a refrigerator having fresh food and freezer compartments, temperature sensors in each of the compartments and cooling apparatus for causing the temperatures within such compartments to approach first and second set point temperatures, respectively, comprising:

a first set point register for storing a first value corresponding to a first set point temperature for the fresh food compartment;

a second set point register for storing a second value corresponding to a second set point temperature for the freezer compartment;

a display coupled to the temperature sensors and the set point registers and capable of displaying either of the temperatures within the compartments or either of the first or second set point temperatures; and means coupled to the registers for selecting operation of the refrigerator in either a manual mode of operation wherein a user can adjust the first and second values within first and second ranges, respectively, or one of a plurality of priority modes of operation wherein the first and second set point registers are each loaded with a value from first and second sets of preselected values, respectively, the selecting means comprising means for invoking the manual mode of operation including a first plurality of manually-actuable keys for enabling a user to display and/or adjust the first and second values including a set temperature key, up and down temperature keys and fresh food and freezer compartment keys, the invoking means further including means for operating the display to indicate the temperature of the fresh food or refrigerator compartment when the fresh food compartment key or the freezer compartment key is actuated alone and to indicate the first or the second set point temperature when the set temperature key is actuated within a predetermined time of actuation of the fresh food compartment key or the freezer compartment key, respectively, and means for varying either of the first or second set point temperatures when the set temperature key and either of the up or down temperature keys and either of the fresh food compartment or freezer compartment keys are actuated within a preselected time of each other, and means coupled to the first and second set point registers for invoking the priority modes of operation including a second plurality of manually-actuable keys which enable a user to select one of the priority modes and thereby replace either or both of the values stored in the first and second set point registers with a value from the first and/or second sets of preselected values, the priority modes being prioritized into a first or highest priority level, a second or intermediate priority level and a third or lowest priority level, the second plurality of keys including a vacation key which, when actuated, causes the first and second set point registers to be loaded with values in the lower portion of each of the first and second ranges consistent with optimum long-term preservation of food and a clear key for cancelling the priority modes of operation, the priority mode invoking means further including means for preventing subsequent adjustment of the values stored in the first and second set point registers by actuation of the first plurality of keys until the clear key has been actuated and means for preventing immediate operation in a given priority mode of a particular level if such priority mode is invoked at a time when a priority mode of a higher level is in effect.

29. The temperature set point control of claim 28, wherein the preventing means includes means for delaying operation in the given priority mode until the priority mode of the higher level has terminated.

30. The temperature set point control of claim 28, further including indicators associated with a portion of the keys of the first and second pluralities for indicating actuation thereof.

31. The temperature set point control of claim 28, wherein the second plurality of keys includes an auto temperature key for selecting an automatic temperature mode whereby preselected values consistent with efficient operation of the refrigerator are loaded into the first and second set point registers, and first and second keys for selecting maximum refrigeration modes for the fresh food and freezer compartments, respectively, the automatic temperature mode being prioritized in the lowest priority level, the vacation mode being prioritized in the intermediate priority level and the maximum refrigeration modes being prioritized in the highest priority level.

* * * * *